(12) United States Patent
Basham et al.

(10) Patent No.: US 8,117,394 B2
(45) Date of Patent: Feb. 14, 2012

(54) CONSISTENCY MODEL FOR OBJECT MANAGEMENT DATA

(75) Inventors: Robert B. Basham, Aloha, OR (US); Andrew G. Hourselt, Tucson, AZ (US); Muthu A. Muthiah, Bandalore (IN); Vipul Srivistava, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 758 days.

(21) Appl. No.: 12/185,233

(22) Filed: Aug. 4, 2008

(65) Prior Publication Data

US 2010/0030969 A1    Feb. 4, 2010

(51) Int. Cl.
*G06F 12/00* (2006.01)
(52) U.S. Cl. .......................... 711/126; 711/118; 711/156
(58) Field of Classification Search .................. 711/126, 711/118, 156
See application file for complete search history.

(56) References Cited

U.S. PATENT DOCUMENTS

| 6,871,346 | B1* | 3/2005 | Kumbalimutt et al. | 718/104 |
| 6,922,722 | B1* | 7/2005 | Mann et al. | 709/220 |
| 7,043,738 | B2 | 5/2006 | Mandal et al. | |
| 7,206,833 | B1* | 4/2007 | Sarangam et al. | 709/224 |
| 7,318,089 | B1* | 1/2008 | Stachura et al. | 709/223 |
| 2003/0033379 | A1 | 2/2003 | Civanlar et al. | |
| 2009/0271569 | A1* | 10/2009 | Kannan | 711/106 |
| 2009/0271573 | A1* | 10/2009 | Kannan | 711/129 |

OTHER PUBLICATIONS

Debusmann et al., "Unified Service Level Monitoring Using CIM," Proceedings Seventh IEEE International Enterprise Distributed Object Computing Conference, 2003, pp. 76-85.

* cited by examiner

*Primary Examiner* — Stephen Elmore
(74) *Attorney, Agent, or Firm* — Lieberman & Brandsdorfer, LLC

(57) ABSTRACT

A method and apparatus are provided for maintaining cache coherency of object management data in a computer system. The computer system is configured with a bit mask to represent changes in object management data. All changes in an object are reflected by setting an associated bit in the bit mask. A cache update of object management data is limited to the bit(s) set in the bit mask.

18 Claims, 5 Drawing Sheets

CONSISTENCY MODEL FOR OBJECT MANAGEMENT DATA

BACKGROUND OF THE INVENTION

1. Technical Field

This invention relates to object management data. More specifically, the invention pertains to maintaining cache coherency of object management data.

2. Description of the Prior Art

The Common Information Model (CIM) is a computer industry standard for defining device and application characteristics so that system administrators and management programs will be able to control devices and applications from different manufacturers or sources in the same way. More specifically, CIM specifies how management information about logical and physical objects on a managed network is stored in management information databases. CIM attempts to provide a consistent and unified view of information so that it can be retrieved by any CIM-compliant network management systems. The CIM is a hierarchical, object oriented architecture that makes it comparatively straightforward to track and depict the often complex interdependencies and associations among different managed objects. Such interdependencies may include those between logical network connections and underlying physical devices, or those of an e-commerce transaction and the web and database servers on which they depend.

The CIM also functions as an industry standard specification to allow for the interchange of management information in a network environment including devices from different vendors, where the network may include heterogonous as well as homogeneous devices. The CIM schema specifies a set of classes, including methods and objects that management programs call to obtain information and perform management operations with respect to devices in the network.

An implementation of CIM, known as Web Based Enterprise Management (WBEM) allows for doing CIM operations over HTTP. It includes an entity called a common information model object manager (CIMOM) that takes the form of a CIM server that receives, validates, and authenticates client application requests. CIMOM directs CIM client requests to the appropriate functional component or to an application provider. In addition, CIMOM provides a repository for storage of management data. Currently, CIMOM uses a generic mechanism to handle queries for retrieving CIM objects from the repository.

Caching data is known in the art as a mechanism utilized to meet performance requirements. Indications are a mechanism employed in CIM to allow a CIMOM asynchronously report to a CIM Client state changes to the storage device being managed to provide data consistency. However, there are drawbacks associated with the employment of the prior art indications mechanism. Such drawbacks include the following: no requirement for the CIMOM to guarantee delivery of indications, no guarantee of ordering of the indications, and the inability to address receipt of multiple indications in a limited time interval. The deficiencies in the indications mechanism mitigate the cache coherency of the managed devices. For example, loss of a critical indication or an improper ordering of indications would create an invalid cache. Accordingly, the limitations associated with the prior art employment of indications do not guarantee cache coherency of the managed devices at the CIM Client.

Therefore, it would be advantageous to have an improved method, apparatus, and computer instructions for improving performance and scalability of data managed by the CIM Client so that access to the managed objects in the repository may be faster, and storage of managed objects require a smaller footprint in the repository. In addition, it would also be advantageous to have an improved method that allows different repositories to be used without significant changes to the underlying server code.

SUMMARY OF THE INVENTION

This invention comprises a method, apparatus, and article for maintaining cache coherency of management data at the CIM Client through employment of a bit mask.

In one aspect of the invention, a method is provided for maintaining cache consistency of management data. Device management data is stored in client data cache, and the device management data is represented in a bit mask stored local to the client. A managed object is polled for changes in device management data. The polling includes use of the bit mask. A bit location in the bit mask is employed for each managed object determined to have modified data. The device management data is updated in the client cache by gathering the management data represented by the bit location employed in the bit mask.

In another aspect of the invention, a computer system is provided with a processor in communication with memory, and data cache in communication with the memory. The data cache is configured to store device management data, and a bit mask is employed to represent device management data. A manager is utilized to poll a managed object for changes in device management data. The manager represents a bit location in the bit mask for each managed object determined to have modified data, and the manager updates device management data in the cache by gathering the management data represented by the bit location represented in the bit mask.

In yet another aspect of the invention, a computer-readable carrier is provided with computer program instructions configured to maintain cache coherency of device management data between a client and a managed object. Instructions are provided to store device management data in client data cache, and to represent device management data in a bit mask stored local to the client. Instructions are provided to poll a managed object for changes in device management data. The polling instructions utilize the bit mask to set a bit location in the bit mask for each managed object determined to have modified data. In addition, instructions are provided to update device management data in client cache by collecting the management data represented by the bit location in the bit mask.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
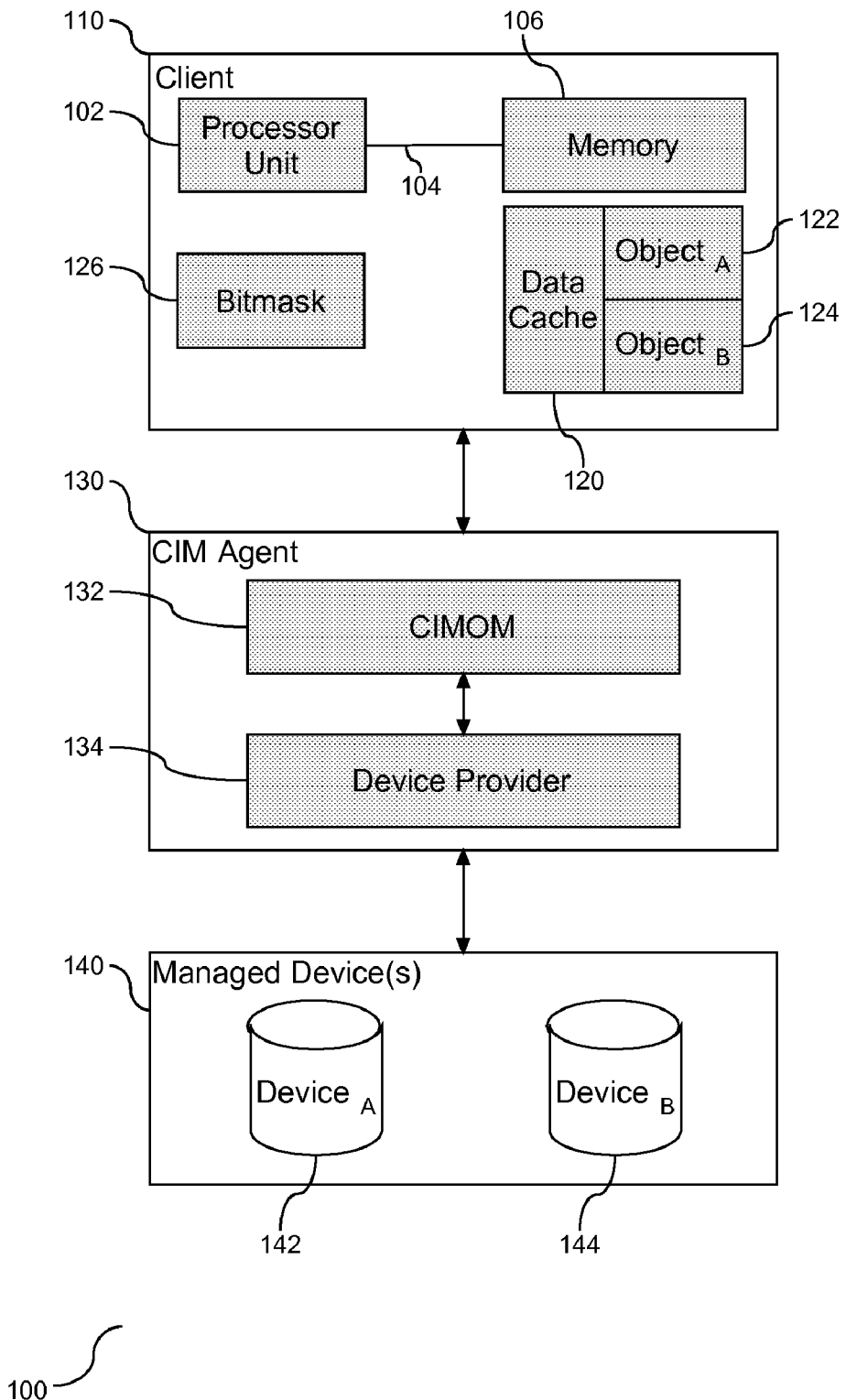
FIG. 1 is a block diagram of a CIM client in communication with a managed device according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. In one embodiment, the manager may be implemented in programmable hardware devices such as field programmable gate arrays, programmable array logic, programmable logic devices, or the like. The managers may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of cache managers etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus, and article of manufacture of the present invention provides valuable advantage over the prior art. According to the present invention, a client in communication with a managed device caches device management data. Cache coherency is maintained such that the client cache is consistent with the state of the managed device. A bit mask is employed in which each bit represents one or more management objects. In response to a change in management data of the represented objects, the associated bit is set. For example, a zero value may be set in a location in the bitmask to indicate that the represented managed objected has modified data, and a one value may be set in a location in the bitmask to indicate that the represented managed object does not have modified data. However, the invention should not be limited to this specific embodiment. In one embodiment, an inverse policy may be employed where a one value in the bitmask location indicates modification of the represented managed object, and a zero value in the bitmask location indicates that the represented managed object does not have modified data. The bit mask may be statically or dynamically polled to determine if there has been a change in the management data of any of the represented objects, or the client may receive a direct indication of a change in the management data. Regardless of the notification mechanism, the bit mask is consulted to determine which objects represented in the bit mask are the subject of the change. The management data update is then limited to the managed objects associated with and represented by the bits set in the bit mask according to the bit setting protocol employed. Accordingly, a change in the management data does not require an update of all of the objects in communication with the client, but rather focuses on those objects in which the management data has changed since a prior update as reflected in the bit mask.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

In computer science, a mask is some data that along with an operation is used to extract information stored elsewhere. The most common mask used is a bit mask, which extracts the status of certain bits in a binary string or number. Bits in the mask may be subject to bit manipulation. Code that is employed for bit manipulation uses logical operators, including AND, OR XOR, and NOT. Using a bit mask, the AND operator may be employed to extract the value of a specific bit in the mask, or to query that status of a bit. Similarly, the OR operator may be employed to separately turn bits on or off, and the exclusive or operator, XOR, may be employed to change the bit to an opposite value. Programming tasks that require bit manipulation include low level device control. Accordingly, it is desirable to employ a bit mask to represent data of a managed device, wherein each bit in the mask represents a class or association.

FIG. 1 is a block diagram (100) of a client (110) in communication with a managed device (140). As shown, a CIM Agent (130), including a CIMOM (132) and a device provider (134), functions as an interface between the client (110) and the managed device (140). The client (110) includes a processor unit (102) in communication with memory (106) via a bus (104). In addition, the client includes data cache (120) to cache data pertaining to the managed device (140). In one embodiment the data maintained in the data cache is data relating to a CIM. Each managed device (140) is reflected in the data cache (120). For example, as shown herein there are two objects in the client (110), object$_A$ (122) and object$_B$ (124), with each of these objects mapped to separate managed devices, Device$_A$ (142) and Device$_B$ (144), respectively. A managed device is known in the art as a peripheral device in a computer system. Examples of such devices include storage devices, controllers, etc. In the example shown herein, there are two managed devices with a separate object in the data cache (120) mapped to the separate managed devices (142) and (144). Although two managed devices and associated objects are shown herein, the invention should not be limited to the quantity illustrated. In one embodiment, there may be additional managed devices or fewer managed devices. Regardless of the quantity of devices in the system, there is a mapping of managed devices to objects in the data cache (120).

The client (110) includes a bit mask (126) to represent the state of the managed devices. More specifically, the bit mask (126) maps a bit to each managed device or association of devices. The CIM Agent (130) functions to convey data pertaining to the state of the managed device to the client (110). For example, one or more of the managed devices (142) and (144) may have a change in the state of operation. In one embodiment, a change in state may include powering down of a device, powering up of a device, addition of a new volume, etc. To convey the change in state from the affected managed device to the client (110), the CIM Agent (130) reflects the change in a bit mask representing the affected managed device, and conveys the bit mask with the bit reflecting the change to the client (110). The setting of the bit reflects a change in state of data pertaining to management of the peripheral device, and does not pertain to I/O data communicated by the peripheral device. The employment of the bit mask allows a bit to be set for one or more managed devices in the system affected by the change of state with an update of a cache limited to the objects associated with the bits set in the bit mask. Accordingly, the bit mask supports granular management of managed objects and cache coherency of the managed objects reflected in the client (110).

Figure 2:
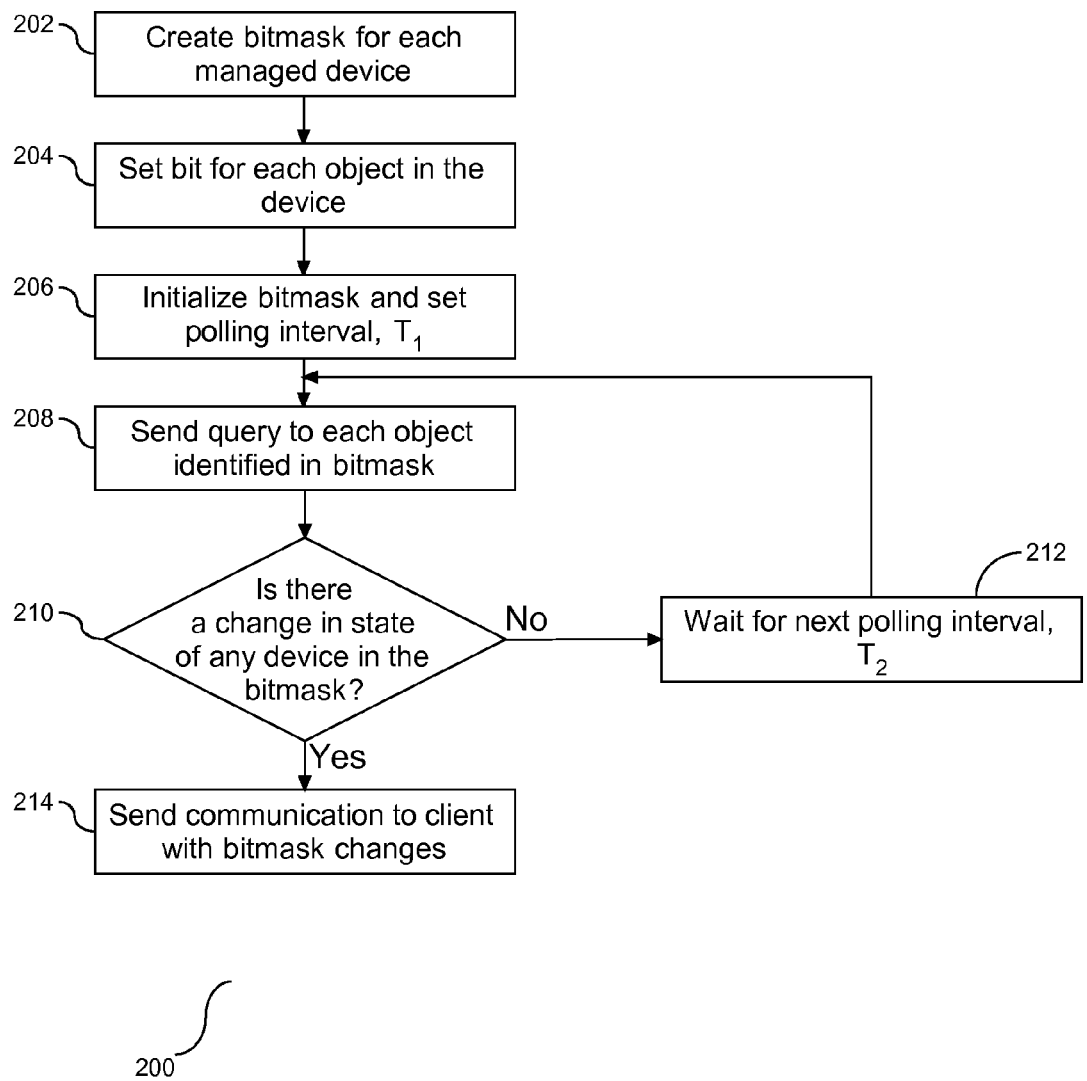
FIG. 2 is a flow chart illustrating a process for periodically polling managed devices.

As noted above, the bit mask supports maintenance of cache coherency of management data between a client and a managed object. FIG. 2 is a flow chart (200) reflecting a process for periodically polling the managed devices in the system in order to maintain the cache coherency of management data local to the client. The polling process discovers changed data of the managed object, i.e. management data. As shown, a bit mask is created for each managed device (202) with a bit set for each object or association in the device (204). In one embodiment, the bit mask is limited to object data that is cached local to the client. Similarly, in one embodiment, management data that is known to change frequently is not reflected in the bit mask. Accordingly, the bit mask is employed to reflect active managed devices that are not subject to frequent changes of the management data.

Following step (204), the bit mask for the managed devices is initialized, and a polling interval, $T_1$, is set (206). The polling interval establishes a fixed time between polling of managed objects reflected in the bit mask. More specifically, each object reflected in the bit mask is periodically polled by the client to determine if the associated management data has changed since the prior poll of the object(s). At the end of the polling interval, a query is sent to the provider for each of the objects identified in the bit mask (208). In association with the query at step (208), it is determined if there has been a change in the state of any of the devices that are reflected in the bit mask (210). A negative response to the determination at step (210) is followed by waiting for the next polling interval, $T_2$, to conclude (212) and a return to step (208). Conversely, a positive response to the determination at step (210) is followed by a communication to the client with the bit mask reflecting changes to the subject managed objects (214). Following receipt of the bit mask at step (214), the client queries the provider to update the client cache for the subject bits of the bit mask (216), and the provider updates the client cache (218). Once step (218) is complete, the client cache is coherent with the current state of the managed objects, and the process returns to step (210). Accordingly, the process of maintaining the client cache coherent with the current state of the managed objects may periodically poll the provider to determine changes in the state of the subject objects and reflects the changes in an associated bit mask.

As shown in FIG. 2, the managed objects that are the subject of the bit mask may be the subject of a polling process, also known as polling based updates. Different mechanisms may be employed for the periodic polling process to maintain the regular intervals of the process. Such mechanisms include but are not limited to user based actions, and a process initiated by an application program interface (API).

However, the state of managed objects does not always change at preset time intervals. Management data of managed objects changes in real-time. In one embodiment, the client may initiate issuance of a polling request that is not within a defined time interval. For example, if the client is going to perform a significant action, a polling action prior to the action is appropriate to ensure the device data in the client cache is current and reflected in the action. Similarly, in one embodiment, the client may receive an indication from the provider that there is a change in the state of one or more of the managed objects. Accordingly, these updates are triggered by an incoming event from the device that is indicative of a change in state.

Figure 3:
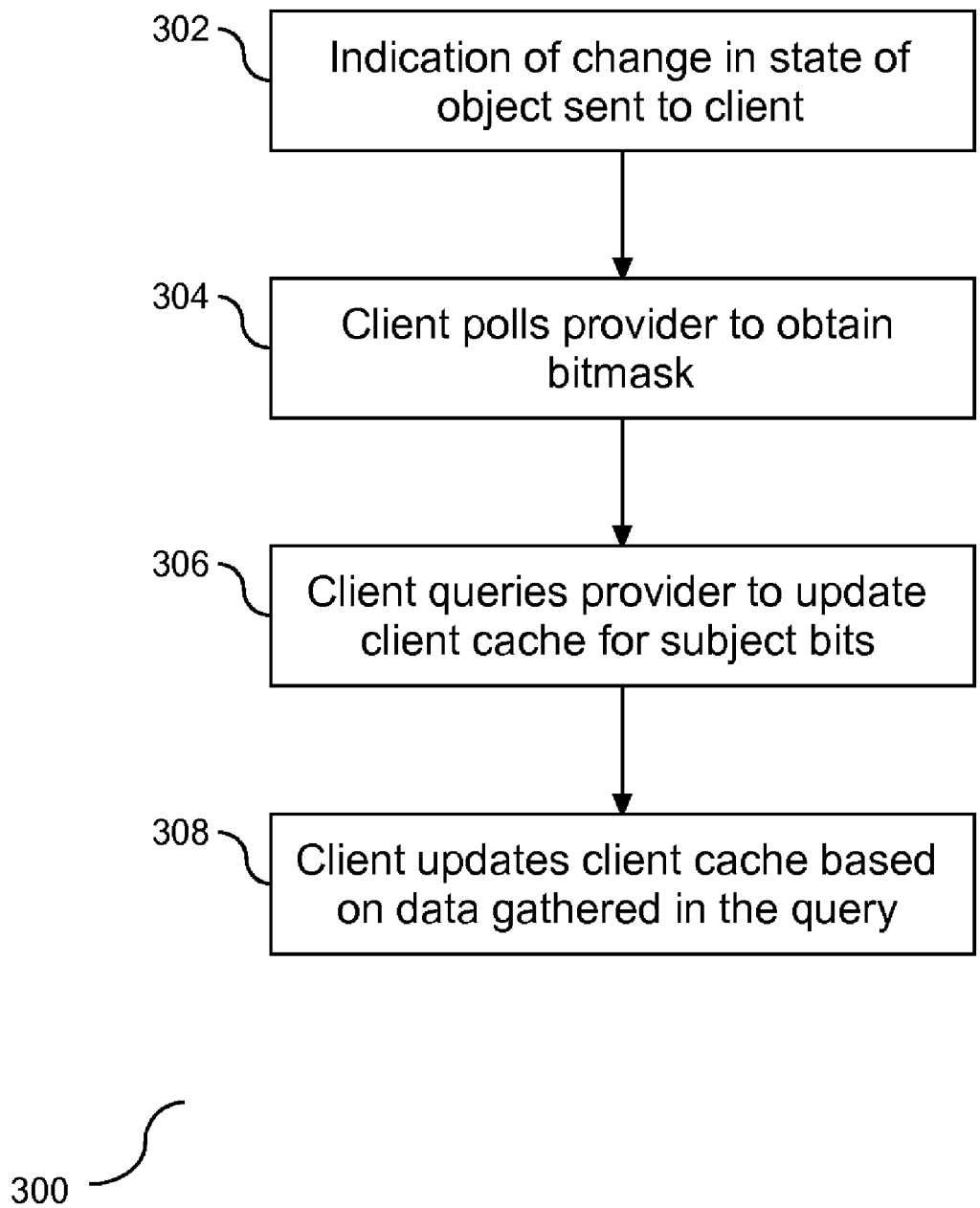
FIG. 3 is a flow chart illustrating issuance of a dynamic polling request.

FIG. 3 is a flow chart (300) that demonstrates issuance of a polling request by a client that does not follow the set periodic intervals demonstrated in FIG. 2. As shown, an indication of a change in the state of one or more of the managed objects is sent from the provider to the client (302). Following receipt of the indication, the client polls the provider to obtain the bit mask reflecting changes to the subject managed objects (304). Following receipt of the bit mask at step (304), the client queries the provider to update the client cache for the subject bits of the bit mask (306), and the provider updates the client cache (308). Once step (308) is complete, the client cache is consistent with the current state of the managed objects. Accordingly, in response to receipt of an indication of a change in state of one or more of the managed objects, the client may initiate an update of the cache to reflect the changes associated with the indication, wherein the client initiated update is not subject to the established polling intervals.

Figure 4:
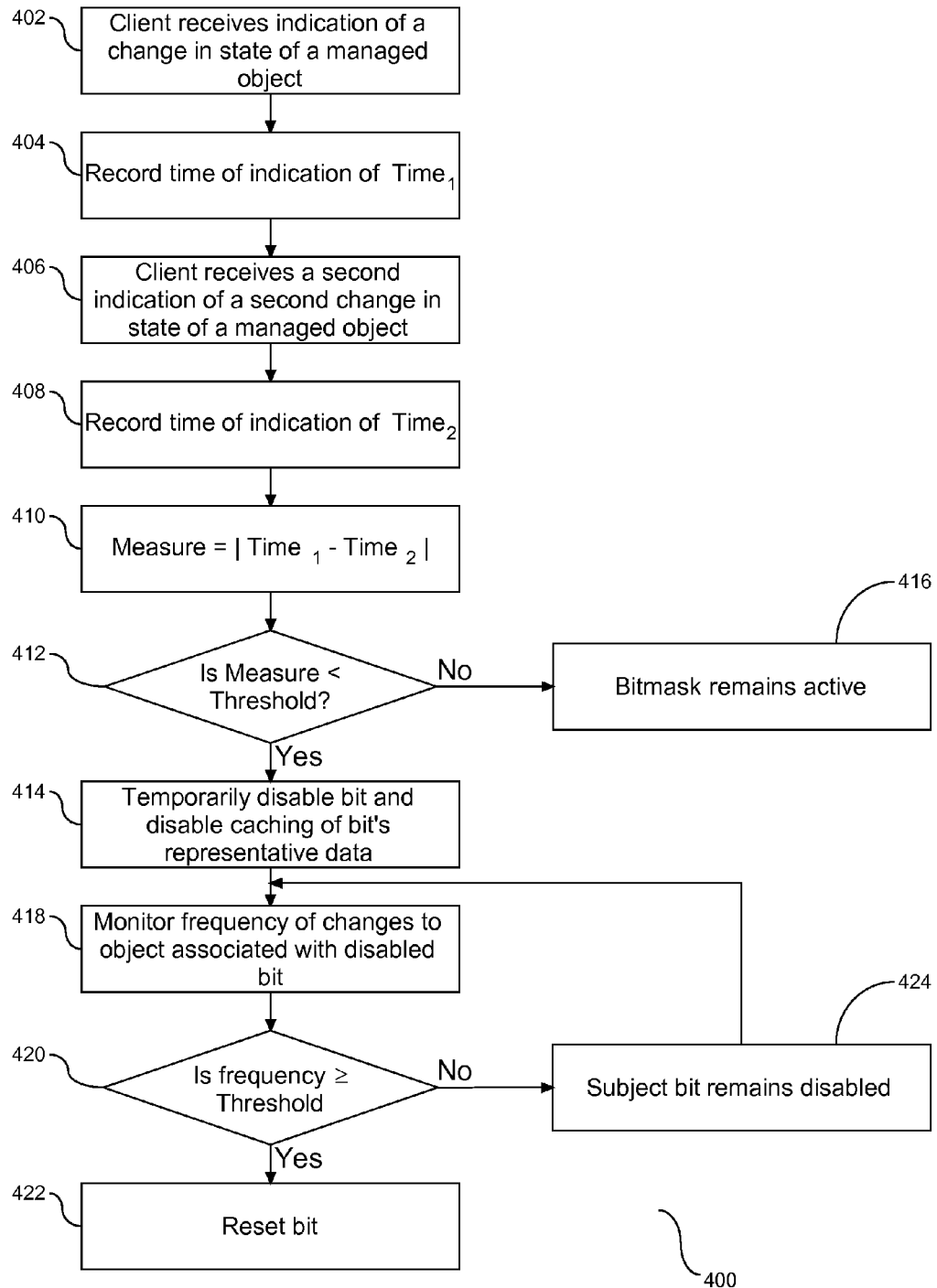
FIG. 4 is a flow chart illustrating a process of receipt of multiple indications of a change of state of the managed object(s).

In an extension of the process illustrated in FIG. 3, the time at which the client receives an indication of a change in the state of one or more of the managed objects is retained. FIG. 4 is a flow chart (400) illustrating the process of receipt by the client of multiple indications of a change of state from the provider. As shown above, the client receives a first indication of a change in the state of a managed object (402). The time at which the indication is received is recorded as $Time_1$ (404). The client proceeds with updating the state of the cache for the bits reflected in the bit mask, as shown in FIG. 3. In response to receipt of a second indication of a change in the state of the managed object (406), a second time, $Time_2$, is recorded (408). In one embodiment, the time intervals are recorded in persistent storage. A measurement is conducted of the time between the adjacent indications (410), and it is determined if the time between the adjacent indications meets a defined threshold (412). The threshold is a measurement of the indications being close in time. In one embodiment, the threshold is a factor of the polling interval. If it is determined that the time difference is less than the threshold, the bit in the bit mask for the subject object is temporarily turned off (414). The convergence of the time intervals is an indication that the changes in the managed objected are frequent. In one embodiment, it may be desirable to wait until all of the changes associated with the object are complete before updating the client cache. Conversely, if it is determined that the time difference is greater than the threshold, the bit in the bit mask for the subject object remains active (416). Accordingly, the time intervals between adjacent indications are recorded in order to manage the update of the client cache.

Following a shut-down of the bit at step (414), updates of the object data cache associated with this bit are temporarily disabled. However, at some point in time the frequent updates of the subject object will cease and that bit is reactivated so that the periodic updates of the client cache may resume. The bit associated with the subject managed object is periodically monitored to determine the frequency of changes to the managed object (418). It is then determined if the frequency of changes has met a threshold of time intervals without changes (420). A positive response to the determination at step (420) is followed by a reset of the subject bit in the bit mask (422). Conversely, a negative response to the determination is followed by the subject bit in the bit mask remaining disabled (424) and a return to step (418). The threshold employed at step (420) may be a fixed amount of time, such as being defined with respect to the length of a polling interval, or a factor thereof. In one embodiment, the threshold employed at step (420) is dynamic. Accordingly, the shut-down and subsequent re-start of a bit upon detection of frequent changes to one or more objects enables the cache coherency of the managed object to be efficiently maintained.

As shown herein, the cache management system functions as a solution for maintaining cache coherency between the client and the managed objects. The processes shown in FIGS. 2-4 are methods for employing a bit mask to appropriately focus the object data cache that requires updating, and mitigate updating cache for objects that have not been subject to frequent changes. In one embodiment, the cache management system may be implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer-readable medium can be any apparatus that can contain, or store the program for use by or in connection with the instruction execution system, apparatus, or device.

Figure 5:
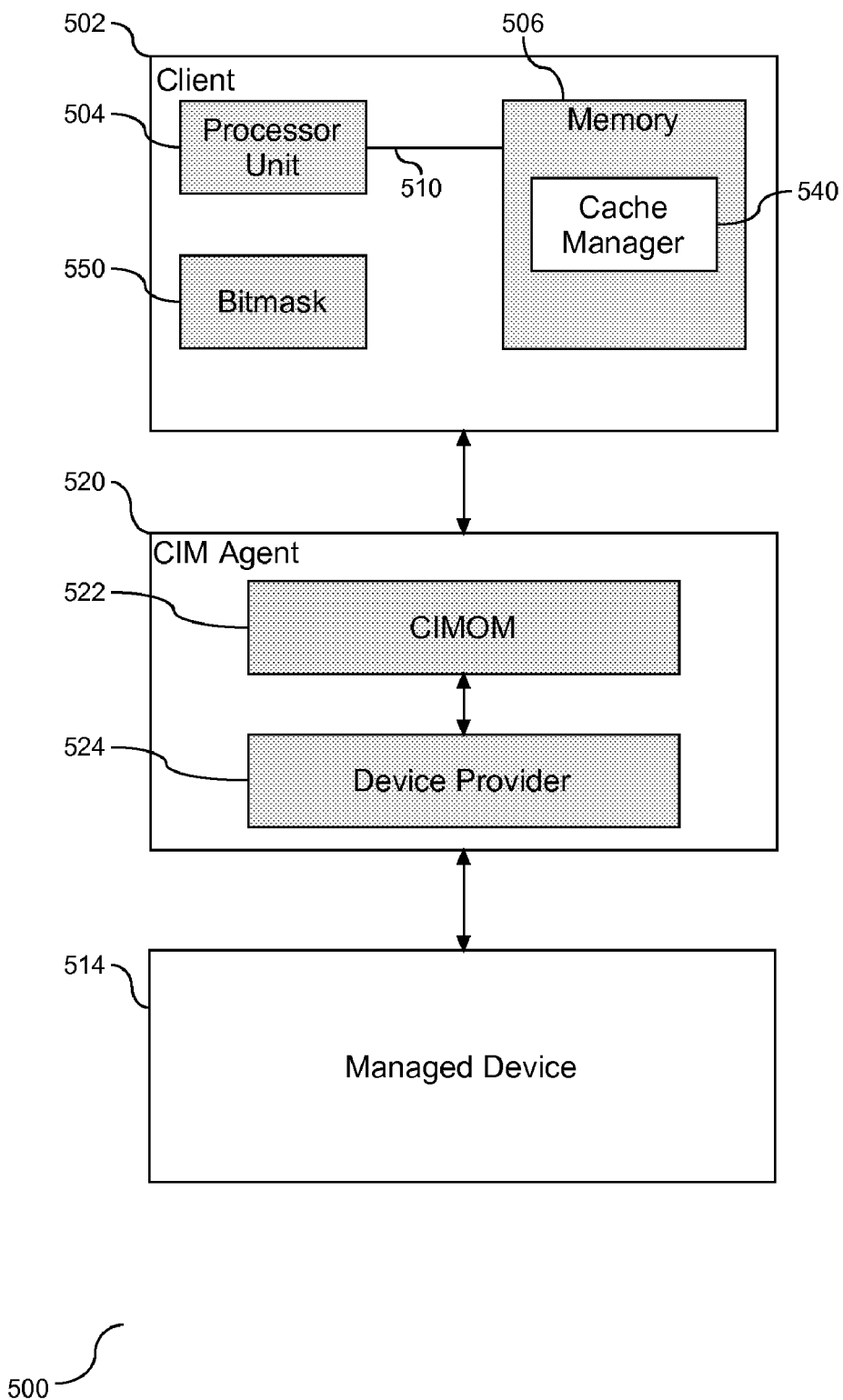
FIG. 5 is a block diagram of a computer system with an embedded manager to monitor and maintain cache coherency between a client machine and a managed object.

FIG. 5 is a block diagram (500) illustrating placement of a cache manager in a computer system. The illustration shows a client (502) with a processor unit (504) coupled to memory (506) by a bus structure (510). Although only one processor unit (504) is shown, in one embodiment the client (502) may include more processor units in an expanded design. As shown in FIG. 2, the client (502) is in communication with at least one managed objects (514) through a CIM Agent (520). Although only one managed object (514) is shown herein, the invention should not be limited to this quantity of managed objects. The CIM Agent (520) is shown with a CIMOM (522) and a device provider (524). The functionality of the CIMOM (522) and device provider (524) are described in detail with respect to FIG. 1. A cache management tool in the form of a cache manager (540) is shown residing in memory (506) of the client (502). The cache manager (540) mediates and facilitates updating client object data cache through use of a bit mask (550), wherein each bit in the bit mask represents one or more objects associated with the managed device(s) (514). In one embodiment, the bit mask (550) is retained in persistent storage. The cache manager (540) may utilize instructions in a computer readable medium to invoke a polling action of the bit mask to determine if any of the management data in the subject object data has one or more modified value(s). In one embodiment, one or more bits in the bit mask may be temporarily disabled by the cache manager (540). Although the cache manager (540) is shown residing in memory (506), the invention should not be limited to this embodiment. In one embodiment, the cache manager (540) may reside as a hardware tool external to memory (506) or implemented as a combination of hardware and software. Accordingly, the cache manager (540) may be implemented as a software tool or a hardware tool to facilitate management of the object data cache through use of the bit mask.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Some Advantages Over the Prior Art

Employment of a bit mask with one bit representing one or more managed objects provides an efficient and model for maintaining cache coherency of object management data local to the client. Updates of the cache may be conducted periodically through a polling mechanism, or in real-time, i.e. dynamically, responsive to receipt of an indication of a change in the management data. The bit mask enables the cache update to be limited to the specified bits, in which the objects represented by the specified bits are the only objects that are subject to an update. Unless specified, the cache update is not for all of the objects represented in the bit mask, rather it is limited to the bits in the bit mask that reflect a change in the represented object. Accordingly, the bit mask provides a mechanism in which a focused update of the object data cache is limited to those objects in which the management data has been subject to change.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for maintaining cache consistency of management data, comprising:
   storing, by a processor, device management data in client data cache;
   representing device management data in a bit mask stored local to the client;
   polling, by the processor, a managed object for changes in device management data, including employing the bit mask with the polling;
   employing a bit location in the bit mask for each managed object determined to have modified data; and
   updating, by the processor, device management data in client cache for each bit location employed in the bit mask.

2. The method of claim 1, wherein the step of updating device management data in client cache includes limiting the data update to the bit location employed in the bit mask.

3. The method of claim 2, further comprising polling a provider of the managed objects in response to receipt of an indication of a change to object management data.

4. The method of claim 2, further comprising polling a provider of the managed objects at discrete preset intervals.

5. The method of claim 1, further comprising turning off a bit location in the bit mask in response to a frequency of setting of the bit location exceeding a threshold time interval, including disabling an update of object data cache represented by the turned off bit location.

6. The method of claim 5, further comprising resetting the turned off bit location after a threshold time period has expired without changes to an object represented by the turned off bit location.

7. A computer system, comprising:
   a processor in communication with memory;
   data cache in communication with the memory to store device management data;
   a bit mask to represent device management data;
   a manager to poll a managed object for changes in device management data, said manager to represent a bit location in the bit mask for each managed object determined to have modified data; and
   said manager to update device management data in the cache to the bit location represented in the bit mask.

8. The system of claim 7, wherein the update of device management data in the cache includes the manager to limit the data update to the bit location represented in the bit mask.

9. The system of claim 8, further comprising the manager to poll a provider of the managed objects in response to receipt of an indication of a change to object management data.

10. The system of claim 8, further comprising the manager to poll a provider of the managed objects at discrete preset intervals.

11. The system of claim 8, further comprising the manager to turn off a bit location in the bit mask in response to a frequency of setting of the bit location exceeding a threshold time interval, including disabling an update of object data cache represented by the turned off bit location.

12. The system of claim 11, further comprising the manager to reset the turned off bit location after a threshold time period has expired without changes to an object represented by the turned off bit location.

13. An article comprising:
   a computer-readable carrier including computer program instructions configured to maintain cache coherency of device management data between a client and a managed object, the instructions comprising:
   instructions to store device management data in client data cache;
   instructions to represent device management data in a bit mask stored local to the client;
   instructions to poll a managed object for changes in device management data, including employing the bit mask with the polling;
   instructions to set a bit location in the bit mask for each managed object determined to have modified data; and
   instructions to update device management data in client cache to the bit location in the bit mask.

14. The article of claim 13, wherein the instructions to update device management data in client cache includes limiting the data update to the bit location set in the bit mask.

15. The article of claim 14, further comprising instructions to poll a provider of the managed objects in response to receipt of an indication of a change to object management data.

16. The article of claim 14, further comprising instructions to poll a provider of the managed objects at discrete preset intervals.

17. The article of claim 13, further comprising instructions to turn off a bit location in the bit mask in response to a frequency of setting of the bit location exceeding a threshold time interval, including disabling an update of object data cache represented by the turned off bit location.

18. The article of claim 17, further comprising instructions to reset the turned off bit location after a threshold time period has expired without changes to an object represented by the turned off bit location.

* * * * *